United States Patent [19]
Jacobs et al.

[11] Patent Number: 6,007,945
[45] Date of Patent: Dec. 28, 1999

[54] NEGATIVE ELECTRODE FOR A RECHARGEABLE LITHIUM BATTERY COMPRISING A SOLID SOLUTION OF TITANIUM DIOXIDE AND TIN DIOXIDE

[75] Inventors: James K. Jacobs; Sankar Dasgupta, both of Toronto, Canada

[73] Assignee: Electrofuel Inc., Toronto, Canada

[21] Appl. No.: 08/949,099

[22] Filed: Oct. 10, 1997

Related U.S. Application Data

[60] Provisional application No. 60/028,473, Oct. 15, 1996.

[51] Int. Cl.$^6$ ...................................................... H01M 4/48
[52] U.S. Cl. ..................................... 429/218.1; 429/231.5
[58] Field of Search ............................... 429/218.1, 231.5, 429/231.95; 423/610, 618

[56] References Cited

U.S. PATENT DOCUMENTS

| | | | |
|---|---|---|---|
| 3,776,834 | 12/1973 | O'Leary | 204/290 |
| 5,171,413 | 12/1992 | Arntz et al. | 204/192.15 |
| 5,284,721 | 2/1994 | Beard | 429/194 |
| 5,294,503 | 3/1994 | Huang et al. | 429/194 |
| 5,401,599 | 3/1995 | Tahara et al. | 429/218 |
| 5,418,090 | 5/1995 | Koksbang et al. | 429/224 |
| 5,478,671 | 12/1995 | Idota | 429/194 |
| 5,518,838 | 5/1996 | Bai et al. | 429/191 |
| 5,518,842 | 5/1996 | Fey et al. | 429/218 |
| 5,545,468 | 8/1996 | Koshiba et al. | 429/218 |
| 5,618,640 | 4/1997 | Idota et al. | 429/194 |
| 5,665,265 | 9/1997 | Gies et al. | 252/62.2 |
| 5,766,789 | 6/1998 | James et al. | 429/44 |
| 5,843,592 | 12/1998 | Barker et al. | 429/50 |

*Primary Examiner*—Maria Nuzzolillo
*Assistant Examiner*—Jennifer O'Malley

[57] ABSTRACT

Solid solution of titanium dioxide and tin dioxide is utilized as the anode active substance in the negative electrode of a rechargeable lithium battery. The lithium battery comprised of a negative electrode containing particles of titanium dioxide-tin dioxide solid solution, a non-aqueous lithium ion bearing electrolyte and a positive electrode, usually made of a lithium containing chalcogenide compound provides stable voltage, has high reversible anode capacity and high energy density.

10 Claims, No Drawings

NEGATIVE ELECTRODE FOR A RECHARGEABLE LITHIUM BATTERY COMPRISING A SOLID SOLUTION OF TITANIUM DIOXIDE AND TIN DIOXIDE

This application claims the benefit of U.S. Provisional Application Ser. No. 60/028,473, filed Oct. 15, 1996.

FIELD OF INVENTION

This invention is related to electrochemical cells or batteries, more particularly to rechargeable lithium batteries.

BACKGROUND OF THE INVENTION

Rechargeable or secondary lithium batteries are often used in electronic devices requiring a steady and reliable source of electrical energy. The essential components of a rechargeable lithium battery are an anode or negative electrode, a cathode or positive electrode and a lithium ion conducting non-aqueous electrolyte. The anode active component of a rechargeable lithium battery is a substance which is capable of inserting or intercalating lithium ions when the battery is charged and releasing lithium ions when the battery is discharged. The cathode active component of a rechargeable lithium battery is capable of incorporating lithium ions reversibly, whereby the lithium ions are released when the battery is charged and are reincorporated in the cathode active component on discharge. The electrolyte of a rechargeable lithium battery is usually a non-aqueous electrolyte, most commonly a solid or liquid polymer bearing a lithium compound having dissociable lithium ions, or a microporous polymer which has been impregnated with an organic liquid having a lithium salt dissolved therein, or any non-aqueous substance that is capable of conducting electricity by means of movement of lithium ions. The cathode active component is commonly a lithium containing chalcogenide, most frequently a lithium containing transition metal oxide.

Transition metal oxides and solid solutions of such oxides have been known to be utilized in the positive electrode of a rechargeable lithium battery and are described, for example, in U.S. Pat. No. 5,518,842, issued on May 21, 1996 to Fey et al.

Carbon in the form of graphite or petroleum coke or similar high purity carbon particles, which readily intercalates lithium ions, is often used as the anode active substance in rechargeable lithium batteries. It is known that a portion of the lithium inserted in the carbon particles and similar intercalating substances, is retained irreversibly, the irreversibility may be affected by several factors, such as history of the heat treatment of the carbon particles, variations in crystal structure, particle size and so on, resulting in different amounts of irreversibly retained lithium in the anode. The reversible capacity of carbon in a lithium ion battery varies between 310 and 380 mAh/g (443.4–533.4 mAh/cm$^3$, based on 1.43 g/cm$^3$ bulk density for graphite commonly used in carbon anodes). Carbon in the form utilized in anodes, is relatively inexpensive and readily available, however, the energy density that carbon containing anodes are capable of providing is usually not as high as would be desirable; furthermore, carbon is light and voluminous, hence cannot be packed densely, which further reduces the energy density obtainable from negative electrodes containing carbon as the anode active substance. It is to be noted, however, that most rechargeable lithium batteries contain some lithium which does not participate in the charging-discharging process step in other battery components, that is usually the cathode and the electrolyte also have a portion of irreversibly bonded lithium ions.

There are publications describing substances other than carbon, which are capable of reversibly inserting lithium ions. U.S. Pat. No. 5,294,503, issued on Mar. 15, 1994, to Chen-Kuo Huang et al. teaches the utilization of lithium-magnesium-silicon compounds as anodes in a rechargeable lithium battery. Other glassy-type compounds, containing for example boron, in which elemental lithium is dissolved, have also been known to be used as anode active materials in rechargeable lithium batteries. U.S. Pat. No. 5,284,721 issued to K. W. Beard on Feb. 8, 1994, describes compounds having the general formula of $Li_xM_aX_b$ for utilization in the anode of a lithium secondary battery, where M is one of scandium, titanium, yttrium or zirconium, and X is a chalcogen, usually oxygen or sulphur. In particular, K. W. Beard utilizes lithium titanium oxides as anode active compounds. Koksbang et al. in U.S. Pat. No. 5,418,090, issued on May 23, 1995 describe the use of lithium-manganese compounds of different oxygen contents in the anode and in the cathode of a rechargeable lithium battery. Yoshio Idota in U.S. Pat. No. 5,478,671 describes the use of a lithium-transition metal oxide or a lithium-transition metal vanadate as the anode-active material of a rechargeable lithium battery. There are several other instances in which a metal oxide or a metalloid oxide doped with lithium is the active material of the anode of a rechargeable lithium battery, for example, in U.S. Pat. No. 5,545,468, issued on Aug. 13, 1996 to Nobuharu Koshiba et al. a rechargeable lithium battery anode is described, containing a lithium bearing titanate having the general formula $Li_xTi_yO_4$, and having a specific crystal structure. Tin oxide is also known to be capable of incorporating lithium ions and hence to form the negative-active component of the anode of a rechargeable lithium battery. It is noted, however, that the above discussed lithium-metal oxide compounds although capable of providing lithium secondary batteries having high energy density initially, often exhibit a noticeable drop in the energy density after repeated discharging and charging, suggesting that the insertion of lithium ions in the anode active component may become irreversible due to changes in crystal structure or grain size, or to similar effects. In other words, the above described oxide compounds may replace carbon as the conventional anode active material utilized in rechargeable lithium batteries, however, their readiness in incorporating lithium ions reversibly and repeatedly has not been clearly demonstrated.

There is a need for an anode active compound for use in a rechargeable lithium battery, which is oxidation and corrosion resistant, provides high reversible anode capacity even after repeated cycling and which is also dense.

SUMMARY OF THE INVENTION

A new anode active material has been found for incorporation in the negative electrode of a rechargeable lithium battery comprising a solid solution of titanium dioxide and tin dioxide capable of reversibly intercalating lithium. The negative electrode in addition may contain a low amount of particulate carbon to enhance the electrical conductivity of the electrode, and a binder compound.

The rechargeable lithium battery having negative electrode made according to this invention, has a positive electrode containing a conventional lithiated transition metal compound, a non-aqueous lithium bearing electrolyte and current collectors in contact with the negative and the positive electrode, respectively.

DETAILED DISCUSSION OF THE PREFERRED EMBODIMENTS

As discussed above, in conventional rechargeable or secondary lithium batteries carbon of different origin and having different pretreatment history and crystallite size, is often used in the negative electrode or anode. In another type of rechargeable lithium battery oxidic and glassy metalloid anode active substances have been utilized. Carbon has certain advantages over oxidic and glassy metalloid anode active compounds, but the latter group of substances may be less sensitive to corrosion and are more dense.

It has been found that solid solutions of transition metal oxides and certain non-transition metal oxides can be particularly suitable for utilization as anode active substances, one reason for such utility may be that a solid solution can incorporate lithium ions in its structure with more ease than an oxide of a single metal. Tin dioxide has been used in the past in electro-optical devices as a material which can transmit light in thin layers as well as electrons. The use of lithium containing titanates as electrodes has also been known, however, there is no known record of titanium dioxide-tin dioxide solid solution being utilized as a reversible lithium insertion compound. A titanium dioxide-tin dioxide solid solution when utilized in the negative electrode of a rechargeable lithium battery has now been found to be capable of providing high reversible anode capacity. The battery voltage measured in conjunction with a conventional transition metal oxide cathode was found to be higher than 3.4 volts.

The phase diagram of the $TiO_2$—$SnO_2$ system shows that tin dioxide forms solid solution with titanium dioxide in a continuous range at temperatures higher than 1300° C., but it is also shown that the system has a miscibility gap at lower temperatures. It can thus be expected that a composition containing higher than 16 mol. % tin dioxide and lower than 83 mol. % titanium dioxide will decompose on cooling to form an intimate mixture of crystallites of two, or under certain circumstances more, different solid solution compositions, namely) tin oxide which contains dissolved $TiO_2$ and titanium dioxide which has less than 20 mol. % $SnO_2$ dissolved therein. The titanium dioxide-tin dioxide solid solution or the mixture of titanium dioxide-tin dioxide solid solutions, is prepared in a usual manner of reacting tin dioxide with titanium dioxide at high temperatures and regrinding the obtained solid solution (or mixtures of such) to less than 15 µm particle size. Other known methods for preparation of oxide solid solutions, such as for instance, coprecipitation and subsequent drying and/or heat treatment of the precipitate, may also be used. For the sake of clarity, the titanium dioxide-tin dioxide compositions capable of intercalating lithium ions will be referred in the discussion hereinbelow as titanium dioxide-tin dioxide solid solution, irrespective of whether it is a single phase solid solution or an intimate mixture of titanium dioxide-tin dioxide solid solutions. The overall composition of the anode active substance of the present invention may range between 5:95=$TiO_2$:$SnO_2$ and 90:10=$TiO_2$:$SnO_2$, mole ratios, but it is preferably close to the range of one of the readily forming intermetallic compound compositions of metallic tin and metallic titanium in the binary metal system. The known titanium-tin intermetallic compounds in the titanium-tin binary system are: $Ti_3Sn$, $Ti_2Sn$, $Ti_5Sn_3$ and $Ti_6Sn_5$, however, these intermetallic compounds may have wide ranges of non-stoichiometry. The titanium to tin ratios in the intermetallic compounds and the titanium dioxide to tin dioxide ratios required for providing the preferred compositions have been tabulated in Table 1 below:

TABLE 1

| Intermetallic comp. | Ti:Sn | $TiO_2$:$SnO_2$ |
|---|---|---|
| $Ti_3Sn$ | 55:45 | 61:39 |
| $Ti_2Sn$ | 45:55 | 51:49 |
| $Ti_5Sn_3$ | 40:60 | 47:53 |
| $Ti_6Sn_5$ | 33:67 | 39:61 |

In the above Table 1 the atomic weight of titanium was taken as 47.9 and that of tin as 118.7, in converting atomic ratios to weight ratios.

It is noted that the intimate mixture of titanium dioxide-tin dioxide solid solutions may be composed of fully crystallized particles, but if the cooling of the prepared compositions is very fast, a portion of the particles may be in a meta-stable glassy state.

The fine particles of the obtained $SnO_2$—$TiO_2$ solid solution may be conveniently mixed with fine carbon, usually petroleum coke, in less than 6 wt. %, and with a conventional binder, and loaded on one face of an electrically conductive carrier in a thin layer. The electrically conductive carrier usually serves as a current collector and is inert with respect to the titanium dioxide-tin dioxide solid solution, the-carbon and the binder. The other face of the titanium dioxide-tin dioxide particle bearing layer is then brought in contact with a conventional non-aqueous solid electrolyte containing mobilizable lithium ions. The cathode is conveniently made of a lithium doped transition metal chalcogenide compound, such as lithium manganese oxide, lithium cobalt oxide, lithium nickel oxide, lithium vanadium oxide, solid solutions thereof, or chemical equivalents, usually mixed with fine carbon to assist in maintaining electrical conductivity and a binder.

The lithium battery having the above components is subsequently charged by introducing lithium ions into the titanium dioxide-tin dioxide solid solution of the anode. The lithium ions may be incorporated into the anode active tin oxide-titanium dioxide solid solution or their intimate mixture, after the lithium battery has been assembled, packaged and sealed, or the assembled lithium battery may be pre-charged by known electrochemical methods prior to packaging.

It is noted that the anode active material of the present invention is capable of providing a reliable rechargeable lithium battery when the battery is first charged, assembled from its components including current collectors and after it has been packaged and sealed, by usual methods. However, it has been found that in instances when the lithium battery is pre-charged electrochemically, the operating battery weight may be reduced and thereby higher energy density per unit weight can be achieved. The cathode of the pre-charged lithium battery is subsequently brought in electrical contact with another current collector. The resulting lithium battery assembly comprising a lithiated titanium dioxide-tin dioxide anode, a lithium ion conducting electrolyte, a lithium containing transition metal chalcogenide cathode, is packaged and sealed by the usual manner, in a corrosion resistant container and equipped with electrical leads for charging and discharging the battery.

EXAMPLE 1

A rechargeable lithium battery was constructed having solid solutions of titanium dioxide-tin dioxide as anode active component. The titanium dioxide-tin dioxide mixture was prepared to have composition close to the atomic ratio in the intermetallic compound $Ti_6Sn_5$, that is the weight of $TiO_2$ to the weight of $SnO_2$ in the mixture was 39:61. The mixture was made up from commercially available fine particles of high purity $TiO_2$ and $SnO_2$ and heated in air to 1100° C. for one hour then allowed to cool, ground to less than 30μm and pelletized. The obtained pellets were subsequently heated to 1100° C., and ground again to have an average particle size of 15μm. The particles of titanium dioxide-tin dioxide solid solution having an overall composition of $TiO_2$:$SnO_2$=39:61 in wt. %, were then mixed with fine petroleum coke and polyvinylidene fluoride binder (commercially available under the name of Kynar), each being present in the mixture in 5 wt %. The mixture was coated in 0.05 mm thickness onto one face of a copper foil. The free face of the titanium dioxide-tin dioxide layer was then brought into contact with a non-aqueous electrolyte which consisted of a microporous polymer film (known commercially as Celguard) impregnated with a solution of $LiPF_6$ dissolved in 1 M concentration, in an organic liquid composed of ethylene carbonate and dimethyl carbonate in 1:1 ratio. The cathode was made of $LiCoO_2$ mixed with fine carbon particles and polyvinylidene fluoride binder. An aluminum foil current collector was attached to the free face of the lithium-cobalt oxide containing cathode. The rechargeable lithium battery so obtained exhibited an open circuit voltage of 3.5 V after having been charged by introducing lithium ions into the anode of the assembled battery in the usual manner.

The lithium battery made as described above was sealed in moisture impervious corrosion resistant packaging and equipped with electrical leads.

The charged battery exhibited a steady cell voltage of 3.2 volts, even after cycling 50 times. The density of the negative electrode made as described above was 3.65 g/cm³, and the reversible capacity of the negative electrode containing $TiO_2$—$SnO_2$ in a ratio of 39:61 by weight, was found to be 1130 mAh/cm³. The obtained rechargeable lithium battery having titanium dioxide-tin dioxide solid solution as the anode active component was calculated to have energy density of 207 watt.hour per liter.

EXAMPLE 2

A rechargeable lithium battery was made having titanium dioxide-tin dioxide containing negative electrode wherein the titanium to tin ratio was close to the composition of $Ti_2Sn$. Titanium dioxide particles were mixed with tin dioxide particles in a weight ratio of 50:50, ground to a fine powder and treated in the same preparative steps as described in Example 1. The prepared $TiO_2$—$SnO_2$ solid solution particles were made into a paste with petroleum coke and polyvinylidene fluoride in 5 wt. % each, and coated on one face of a copper foil. The free face of the $TiO_2$—$SnO_2$ solid solution containing layer was covered with a lithium ion conducting microporous polymer electrolyte similar to that of Example 1, and a lithiated cobalt oxide containing cathode layer. The 3-layer assembly was immersed in an electrolyte having the same composition as the electrolyte used in impregnating the microporous polymer, namely, ethylene carbonate and dimethyl carbonate in 1:1 ratio containing $LiPF_6$ in 1 molar concentration. A lithium foil carried on a stainless steel strip was also immersed in the electrolyte. An external direct potential was applied between the stainless steel strip bearing elemental lithium and the copper foil carrying the titanium dioxide-tin dioxide solid solution layer, to drive lithium ions into the titanium dioxide-tin dioxide solid solution via the lithiated cobalt oxide layer by means of electrochemical transport. The electrochemical charging of the $TiO_2$—$SnO_2$ solid solution was maintained until a potential difference of 380 mv was attained between the lithiated $TiO_2$—$SnO_2$ layer and the cobalt oxide layer. The partially charged lithium battery was subsequently removed from the electrolyte solution, the $LiCoO_2$ containing cathode layer was fitted with a metallic current collector and the partially pre-charged lithium battery was enclosed in moisture impervious polymer packaging and sealed in the usual manner. The reversible capacity of the lithiated titanium dioxide-tin dioxide solid solution containing $TiO_2$ and $SnO_2$ in a ratio of 50:50, was found to be 1110 mAh/cm³. The energy density of the rechargeable lithium battery manufactured as detailed above was measured to be 465 watt. hour/cm³.

The anode active substance made in accordance with the present invention can be used in the anode or negative electrode of any type of rechargeable lithium battery, such as a thin film battery, or rolled into a cylindrical shape or a button-type battery. The anode active titanium dioxide-tin dioxide solid solution is resistant to oxidation and corrosion, and may also be readily manufactured in large quantities at relatively low cost.

Although the present invention has been described with reference to the preferred embodiment, it is to be understood that modifications and variations may be resorted to without departing from the spirit and scope of the invention, as those skilled in the art will readily understand. Such modification and variations are considered to be within the purview and scope of the invention and the appended claims.

We claim:

1. An anode active composition for a negative electrode of a rechargeable lithium battery capable of reversibly intercalating lithium ions, comprising a solid solution of titanium dioxide and tin dioxide, said solid solution containing titanium dioxide and tin dioxide in amounts such that the ratio of titanium to tin in the solid solution corresponds to an intermetallic compound composition range of one of the compounds selected from the group consisting of $Ti_3Sn$, $Ti_2Sn$, $Ti_5Sn_3$ and $Ti_6Sn_5$.

2. An anode active composition for a negative electrode of a rechargeable lithium battery as claimed in claim 1, wherein said solid solution of titanium dioxide and tin dioxide is comprised of an intimate mixture of crystalline solid solution particles of titanium dioxide dissolved in tin dioxide and tin dioxide dissolved in titanium dioxide.

3. An anode active composition for a negative electrode of a rechargeable lithium battery as claimed in claim 2, wherein a portion of said solid solution of titanium dioxide and tin dioxide is present in said composition as a glassy compound.

4. A rechargeable lithium battery comprising:

i) a negative electrode containing an anode active component comprising a solid solution of titanium dioxide and tin dioxide capable of reversibly intercalating lithium ions and having a composition range of $TiO_2$:$SnO_2$ between 90:10 and 5:95 in weight;

ii) a positive electrode comprising a lithiated transition metal chalcogenide compound as cathode active component;

iii) a lithium ion bearing non-aqueous electrolyte;

iv) a first current collector in contact with said negative electrode and a second current collector in contact with said positive electrode; and v) electrical leads and at least one moisture impervious layer for packaging and sealing said rechargeable lithium battery.

5. A rechargeable lithium ion battery as claimed in claim 4, wherein said solid solution of titanium dioxide and tin dioxide contains titanium dioxide and tin dioxide in amounts such that the ratio of titanium to tin corresponds to an intermetallic compound composition range of one of the compounds selected from the group consisting of $Ti_3Sn$, $Ti_2Sn$, $Ti_5Sn_3$ and $Ti_6Sn_5$.

6. A rechargeable lithium battery as claimed in claim 5, wherein said rechargeable lithium battery has been electrochemically pre-charged prior to packaging and sealing said rechargeable lithium battery.

7. A rechargeable lithium ion battery as claimed in claim 5, wherein said negative electrode also contains carbon particles and a binder compound.

8. A rechargeable lithium ion battery as claimed in claim 5, wherein said lithium ion bearing non-aqueous electrolyte is a solid polymer containing mobile lithium ions.

9. A rechargeable lithium ion battery as claimed in claim 5, wherein said lithium ion bearing non-aqueous electrolyte is a microporous polymer impregnated with a lithium ion containing organic solution.

10. A rechargeable lithium ion battery as claimed in claim 5, wherein said lithiated transition metal chalcogenide compound is selected from the group consisting of lithium-manganese oxide, lithium-cobalt oxide, lithium-nickel oxide, lithium-vanadium oxide and solid solutions thereof.

* * * * *